United States Patent [19]

Allen et al.

[11] 4,334,729
[45] Jun. 15, 1982

[54] PENETRATOR ASSEMBLY

[75] Inventors: Ralph A. Allen, Covina; Donald S. Madden, Norco; John T. Zylkowski, Diamond Bar, all of Calif.

[73] Assignee: Kortech Engineering, Inc., Fullerton, Calif.

[21] Appl. No.: 120,066

[22] Filed: Feb. 11, 1980

[51] Int. Cl.³ .............................................. H02G 3/22
[52] U.S. Cl. ................................ 339/125 R; 174/151; 248/49
[58] Field of Search ...................... 339/119 R, 125 R; 174/151, 153, 48, 49; 248/49

[56] References Cited

U.S. PATENT DOCUMENTS

| | | | |
|---|---|---|---|
| 3,781,453 | 12/1973 | Funk et al. | 174/151 X |
| 3,801,722 | 4/1974 | Korner | 174/151 X |
| 4,107,456 | 8/1978 | Schuster | 174/151 |

Primary Examiner—Eugene F. Desmond
Attorney, Agent, or Firm—Fischer, Tachner & Strauss

[57] ABSTRACT

An electrical penetrator assembly for conveying electrical wires through a wall which separates a hostile environment from an adjacent environment suitable for access by human operators. The assembly comprises a unique modular construction formed by a plurality of lead disks each having at least one aperture of axial direction and location appropriate to form a continuous spiraling passageway that is skewed with respect to the axis of the penetrator along at least portions thereof to substantially reduce or eliminate inadvertent escape of the hostile environment through the assembly. The assembly also comprises a positionable connector platform on which connector assemblies provide suitable interconnecting pin structure to mate wires contained within the penetrator to interconnecting cables within the hostile environment. The lead disks are designed to interconnect in only a selected sequence and are contained within at least one steel sleeve housing to facilitate easy removal and reinstallation of the penetrator for maintenance, modification, or addition to the assembly or to the wiring contained therein.

10 Claims, 6 Drawing Figures

PENETRATOR ASSEMBLY

BACKGROUND OF THE INVENTION

This invention relates generally to devices for guiding electrical cables into generally inaccessible environments, and more specifically, to electrical penetrators for carrying a plurality of electrical wires through thick walls designed to isolate a hostile environment on one side of such a wall from a safe environment on the opposite side of the wall.

Numerous requirements commonly arise where it is necessary to place instrumentation and/or various other electrical devices within an environment which is extremely hostile to human life. Hostile environments such as extremely high temperature or hazardous radiation must be isolated from adjacent areas, accessible to human operators, by specially designed walls having requisite materials and thickness to adequately safeguard the health of such operators.

Unfortunately, apertures or pathways through such walls comprising passages for needed electrical cables, simultaneously create weaknesses from a safety standpoint, namely, paths that may also act to allow the escape of some component of the aforementioned hostile environment to the exterior of the wall where operator safety might be substantially endangered. Clearly, substantial safety hazards would be incurred if such electrical conduits were fed through the bare wall structure because such bare feed-through techniques would do nothing to inhibit the escape of components of the hostile environment. In addition, bare feed-through of conduit through the wall structure per se would preclude even routine maintenance, wire modifications, and additions which may be needed as electrical instrumentation or apparatus requirements inside the hostile environment change.

PRIOR ART

There have been some prior art attempts to provide more sophisticated cable runs through the above-described walls by utilizing various non-standard designs of electrical penetrators. Penetrator is an industry recognized term which may be defined as "a device for providing an insulated structural path for electrical wires that pass through a wall of substantial thickness, which wall separates a hostile environment from an adjacent exterior environment suitable for access by human operators". Unfortunately, prior art electrical penetrators have employed standard steel pipe sizes and custom designs without due regard to the possible requirements for maintenance, modifications, or additions. By way of example, some such prior art penetration designs incorporate large junction boxes on the interior side of the aforementioned walls thereby precluding removal of the penetrators and the wiring contained therein to the exterior side of the wall for periodic maintenance.

Thus, while certain prior art penetrator assemblies are known, none known to applicants is readily retractable to permit ease of maintenance, modification, or additions to the penetrator or electrical wires carried thereby. Applicants' invention is readily retractable as a result of the unique design of the penetrator assembly including a novel electrical connector platform at the interior end of the penetrator. The platform is radially positionable relative to the longitudinal axis of the penetrator assembly to provide efficient interconnection means between penetrator connectors and electrical connections inside the hostile environment. In addition, as will be seen hereinafter, applicants' penetrator assembly is particularly compatible with remotely operated devices such as master-slave or electromechanical manipulators to provide ease of connection and disconnection of the wires carried by the penetrator at the interior hostile environment end of the assembly. The unique modular construction of the portion of the penetrator assembly adapted to lie within the wall structure, also provides substantial advantages over prior art devices. One such prior art device is disclosed in U.S. Pat. No. 2,975,807 to Waninger which describes a straight conduit means for conveying electrical conductors that deliver power or such other substances as air, water and the like, to remotely operated moving equipment. Waninger's conduit comprises a plurality of solid parallel members having transverse apertures or bores formed therethrough for carrying various conductors to or from a terminal box.

Two patents to Anderson, namely, U.S. Pat. Nos. 349,472 and 351,615, show straight conduit sections, each such section being formed by a plurality of solid relatively thin clay rings or tile members that are cemented together to form a section of any suitable length. In the earlier Anderson patent, the section illustrated has application as an underground conduit wherein the tiles or rings are provided with a series of perforations or feed-throughs through which electrical conductors are conveyed.

U.S. Pat. No. 259,045 to Richardson also shows an underground conduit for conveying electrical conductors. Richardson discloses multiflue pipe sections coupled to one another to include both straight and curved or angled conduit sections to provide deflections of the conduit.

In U.S. Pat. No. 4,047,543 to Burow the general concept of a guide tube having a spiral configuration for deflecting a continuously supplied linear fibrous material such as yarn is disclosed. In U.S. Pat. No. 4,063,573 to Harting there is a disclosure of a thermal insulation unit designed to cover an elongated pipe body to protect the pipe from elevated furnace temperatures. The insulation comprises a plurality of top and bottom U-shaped members formed from a resilient, heat resistant material.

However, no prior art known to applicants discloses the use of a modular penetrator assembly particularly adaptable for use in a hostile environment such as one subjected to high temperature or radiation. In addition, none of the prior art known to applicants discloses a modular conduit assembly having a positionable platform at one end thereof which is suitable for receiving a detachable electrical assembly block to facilitate removal of the conduit structure for inspection, repair, modification or addition. As a result, all the prior art known to the applicants suffers the disadvantage of incompatibility with remote control apparatus for facilitating connection and removal of electrical connectors of cables carried by a penetrator through a wall separating a hostile environment and a non-hostile environment. All such prior art suffers from the additional disadvantage of precluding ready removal of the penetrator assembly and wires carried therein from such a wall for maintenance, modification, or addition of electrical wires. In addition, prior art devices fail to minimize the possible hazards that might otherwise arise as a result of the escape of said hostile environment.

SUMMARY OF THE INVENTION

The present invention consists of a modular penetrator assembly primarily adapted for conveying a plurality of electrical wires through an aperture in a wall separating a hostile environment from a non-hostile environment. The invention comprises a substantially cylindrical housing of sufficient length to extend through the wall aperture and a plurality of solid disks contained therein and aligned in substantially contiguous serial relation along the longitudinal axis of the cylinder wherein each such disk has at least one aperture and wherein the combination of apertures forms a substantially continuous passage through the disks for guiding such wires. The passage is skewed relative to the longitudinal axis of the cylinder to further resist the transfer of components of the hostile environment from the interior side of the chamber, of which the wall is a part, to the exterior side of the chamber. In addition, because the present invention is particularly adapted for use in a chamber containing a high temperature or radiation environment that requires the use of remotely operated manipulating devices by operators who are provided with visual access to the interior of the chamber by means of windows in the chamber walls, the penetrator assembly of the present invention also advantageously comprises a radially positionable platform extending into the chamber beyond the inside surface thereof and which is suitable for receiving a detachable electrical assembly block for convenient disconnection of the wiring within the penetrating assembly from the electrical devices inside the chamber for ready removal of the penetrator assembly for modification, repair or maintenance.

OBJECTS OF THE INVENTION

It is therefore a primary object of the present invention to provide a modular, readily maintainable, electrical penetrator assembly for conveying a plurality of electrical wires through a wall separating a hostile environment from a non-hostile environment and which overcomes or substantially reduces the disadvantages of prior art assemblies.

It is an additional object of the present invention to provide an electrical penetrator assembly for conveying wires through suitable passages into a hostile environment and which includes a positionable electrical connector platform for increased compatibility with remotely operated master-slave or electromechanical manipulators for ease of installation and removal of said penetrator assembly.

It is still an additional object of the present invention to provide a means for conveying electrical conductors through a wall separating a hostile environment such as a radiation hot cell from a non-hostile environment such as the gallery exterior adjacent to a radiation hot cell and which includes structure which renders such penetrator assembly at least as resistant to leakage of hostile elements from the interior of said hot cell as are the remaining portions of such a wall.

It is still another object of the present invention to provide an electrical penetrator assembly for conveying a plurality of electrical conductors through the wall of a chamber enclosing a hostile environment, which assembly may be frequently removed and reinstalled with a minimum of maintenance or modification of said electrical conduits is required.

BRIEF DESCRIPTION OF THE DRAWINGS

The above indicated advantages and objects of the present invention, as well as additional objects and advantages, will become more evident hereinafter as a result of the detailed description of a preferred embodiment of the invention taken in conjunction with the accompanying drawings in which.

DETAILED DESCRIPTION OF A PREFERRED EMBODIMENT

Figure 1:
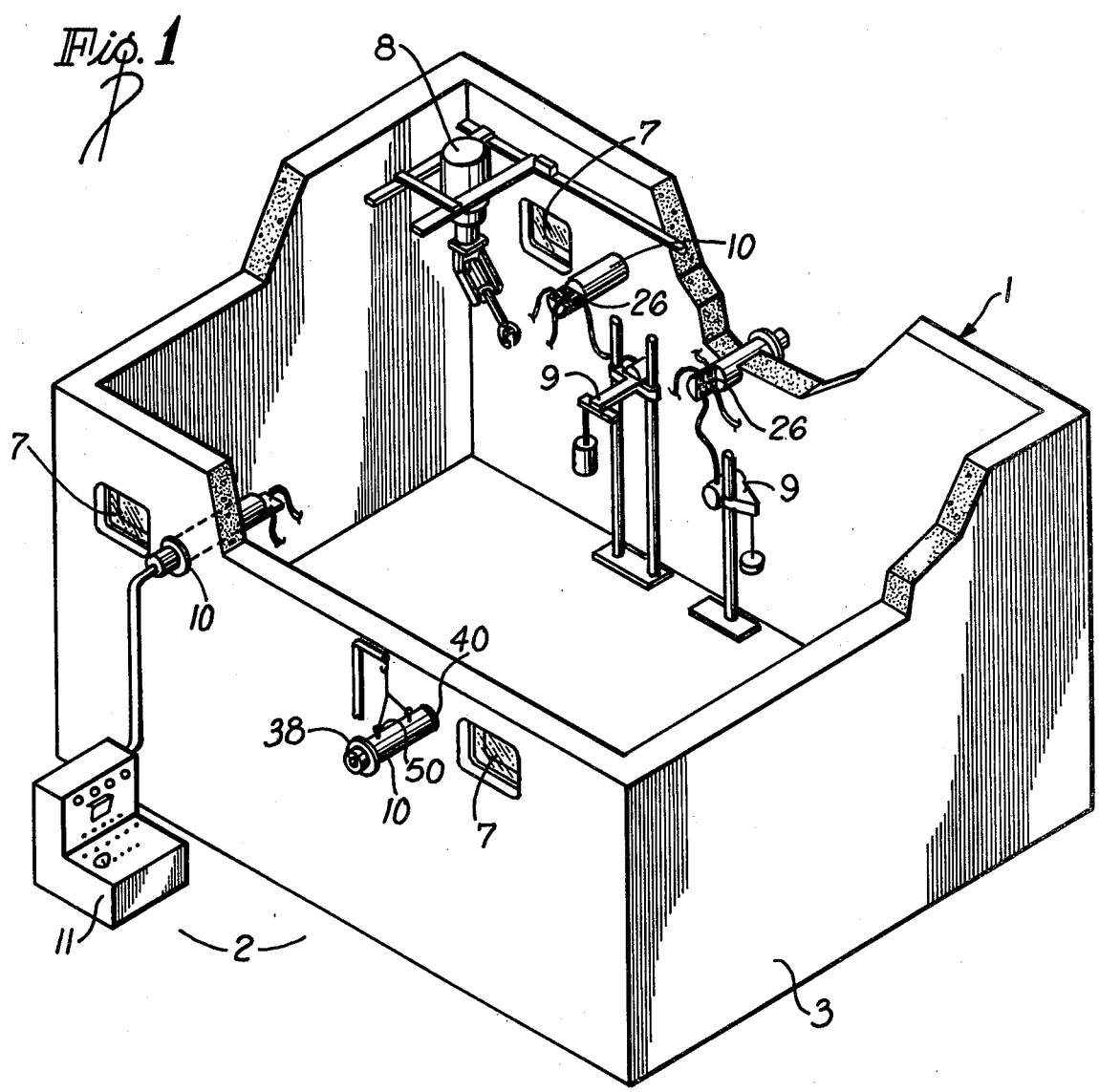
FIG. 1 is a three dimensional view, partially cut-away, of a chamber or hot cell for containing a hostile environment within its confines, and indicating a plurality of typical installations of the present invention.

Referring now to the drawings, FIG. 1 is an elevational three-dimensional view of a facility of the type in which the penetrator assembly of the present invention would be beneficially utilized. The facility illustrated in FIG. 1 consists of an enclosed chamber 1 designed to contain a hostile environment such as an extremely high temperature or high radiation environment. Because such an environment is hazardous to human life, chamber 1 is contained within an outer room or gallery 2 in which it is generally safe for human operators to have access to the exterior of chamber 1. Depending upon the nature of the hostile environment contained within chamber 1 and the degree of protection required to assure the safety of the personnel exterior to the chamber in the gallery area 2, walls 3 are selected to provide the requisite degree of attenuation or insulation of the heat, radiation, or other hazardous components of the environment within the chamber by means of their material content and thickness. By way of example, wall 3 may be made of high density concrete of 48 inch thickness.

As a result of the spherical constraints imposed upon personnel in the gallery area to manipulate any equipment within the chamber, it is common for walls 3 of a hot cell or chamber, 1, to include viewing windows 7 and electromechanical manipulators or other master-slave devices 8. Such devices allow personnel located within gallery area 2 to manipulate equipment within the chamber by remote means. As shown further in FIG. 1, it is common in such hostile environment-containing chambers that electrical equipment such as electrical mechanisms 9 be connected to external electrical systems 11 outside the chamber. It is primarily for this purpose that the electrical penetrator assembly 10 of the present invention is installed in a number of locations in the walls of chamber 1 as indicated in FIG. 1. Electrical penetrator assemblies are shown in FIG. 1 in different installed configurations. By way of example, the two penetrator assemblies 10 shown installed on the far side wall 3 as seen in FIG. 1, have respective electrical connector platforms 26 positioned in different radial directions to promote visibility of such platforms from one or more windows 7 located in that wall.

As also shown in FIG. 1, the lower penetrator assembly 10 of the present invention is indicated to be in the process of installation within the forward-most wall 3 of FIG. 1 in which it is shown that a flange 40, mounted to the outer surface of forward-most wall 3, awaits the mating flange 38 of the penetrator to which it is bolted or otherwise connected when the penetrator is completely extended through the available aperture in wall 3. One of the principal advantages of the present invention, namely, its ease of installation and removal for maintenance and other such purposes, will be better understood hereinafter in conjunction with the description of FIG. 2 which now follows.

Figure 2:
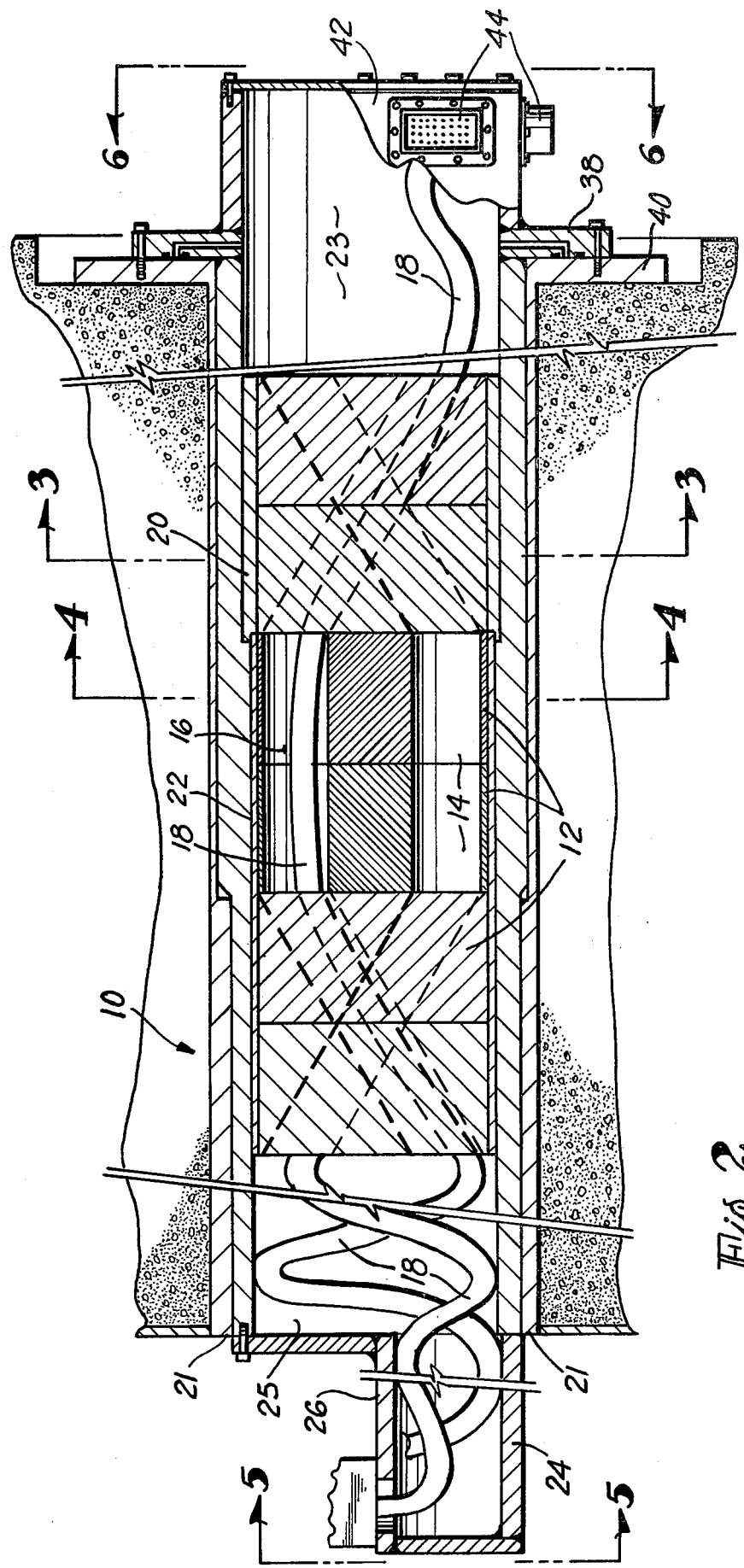
FIG. 2 is a partially cut-away side view of the present invention.

As shown in FIG. 2, electrical penetrator assembly 10 of the present invention comprises a plurality of lead disks 12 each having a pair of apertures of axial direction and location appropriate to form continuous spiraling passageways or conduit runs 14 and 16 through the plurality of disks. Passageways 14 and 16 guide electrical conductors 18 each consisting of a plurality of individual wires appropriately insulated from each other to prevent electrical shorting and signal interference, as required. The combination of lead disks 12 is contained within a pair of overlapping steel sleeve housings 20 and 22. Overlapping of steel housings 20 and 22 is preferable in applications involving high radiation environments to preclude radiation streaming which may otherwise occur along the outside surface of penetrator assembly 10 in a direction parallel to the longitudinal axis of the penetrator. It is for this same streaming-resistance purpose that the two conduit runs or passageways 14 and 16 are preferably spiraling or otherwise non-parallel to the penetrator axis along at least portions thereof to preclude inadvertent escape or leakage of the hostile environment contained within chamber 1 through the penetrator.

Figure 3:
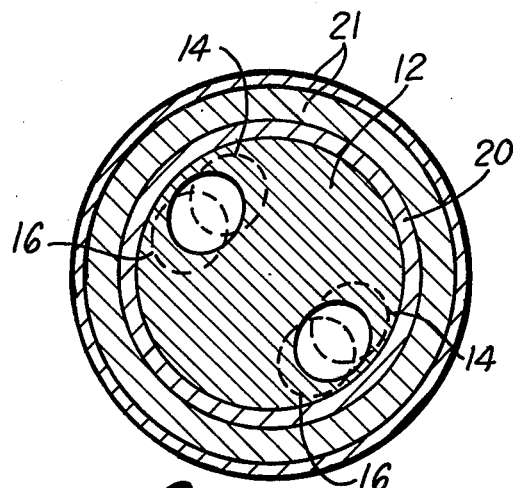
FIG. 3 is a sectional view of the invention taken along lines 3—3 of FIG. 2.
Figure 4:
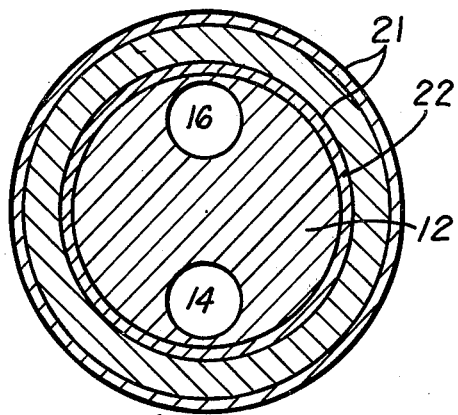
FIG. 4 is a sectional view of the invention taken along lines 4—4 of FIG. 2.

The spiraling shape of apertures or passageways 14 and 16 may be better understood by reference to FIGS. 3 and 4 which provide two cross-sectional views of the penetrator assembly 10 at two distinct locations along the assembly axis, as shown in FIG. 2. It will be observed by comparing FIGS. 3 and 4 that progressing from right to left in FIG. 2, passageway 16 is spiraling upwardly and in a clockwise direction as seen in FIGS. 3 and 4. Simultaneously, passageway 14 is spiraling downwardly in a clockwise direction. In addition to providing passageways 14 and 16 that by means of their spiral or otherwise non-parallel relationship with respect to the longitudinal axis of the penetrator assembly, are stream-resistant, the apertures in each disk provide means for assuring that the appropriate sequence of disks is utilized. In other words, the passages ensure that each disk is in its proper sequence in relation to the remaining disks. Keying techniques may also be utilized to additionally ensure the proper sequence by utilizing a series of tongue and groove combinations on the respective sides of each disk. In addition, such tongue and groove combinations would likely increase the efficiency of assembly and disassembly of the penetrator of the present invention during installation or removal for repair or maintenance. The actual dimensions of each disk and the apertures are dependent upon the thickness requirement of wall 3 and the wire carrying capacity called for in each situation. However, applicants contemplate the use of standard sizes of penetrator assembly configurations including disk diameters of 6 inches, 10 inches, and 12 inches. The diameter of each aperture through the disks is approximately 25% of the overall diameter of the disk and each disk is approximately 6 inches in length along the longitudinal axis of the penetrator. In the embodiment illustrated in FIG. 2, platform 26 has provisions thereon for mounting up to 10 connector assemblies 28 each comprising 104 pins, whereby each aperture or passageway 14 and 16 would convey 520 wires through wall 3. However, it will be understood that either greater or fewer numbers of connector assemblies and wires may be accommodated by the present invention.

Although the illustrated embodiment comprises six disks 12, each made of lead, it will be understood that the number of disks, their dimensions and their material composition may be varied depending on the requirements for attenuation of the components of the hostile environment to preserve minimum safe limits in the gallery side of wall 3. By way of example, in the embodiment of FIG. 2, air gaps 23 and 25, on the gallery and hot cell ends of the disks 12, respectively, are provided, but such gaps may be substantially reduced in length or eliminated if additional attenuation is required.

Figure 5:
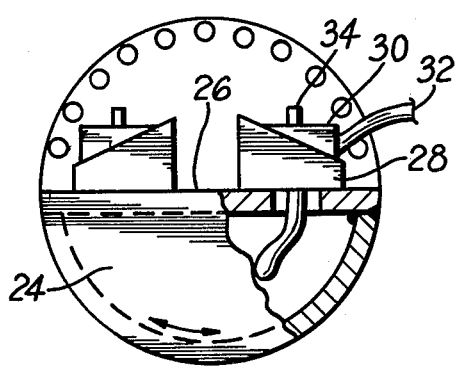
FIG. 5 is an end view of the invention taken along lines 5—5 of FIG. 2 and indicating the portion thereof at the chamber side of a wall.

As further shown in FIGS. 2 and 5, penetrator assembly 10 includes a half-cylinder end portion 24 at the end adapted to extend into chamber 1 beyond the inner surface of wall 3. Half-cylinder 24 is designed to provide a relatively flat connector platform 26 which may be radially positioned about the longitudinal axis of the penetrator assembly relative to the remaining portion of the penetrator. The radial positioning feature of platform 26 enhances operator visibility and promotes convenience in utilizing remotely operated apparatus for either connecting or disconnecting a plurality of connectors contained on the platform. Each such connector consists of a lower connector assembly 28 and an upper connector assembly 30. The connector assemblies provide suitable interconnecting pin structure to mate wires contained within electrical conduit 18 to a cable 32 for conveying electrical signals within chamber 1. In order to facilitate the connection or disconnection of one or more of the aforementioned connector assemblies, each upper connector assembly portion 30 includes a remote manipulator access handle 34.

Although the penetrator assembly 10 of the present invention is readily compatible with any one of a number of various connector assembly configurations suitable for installation on platform 26, one particular connector assembly, especially adapted to remote handling, has been found preferable for use with the present invention and is disclosed and claimed in co-pending patent application Ser. No. 120,069 filed on Feb. 11, 1980, and held by the assignee of the present invention.

Figure 6:
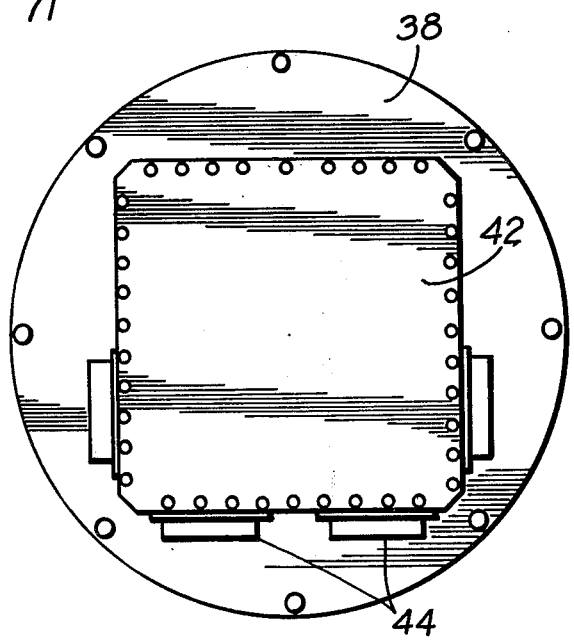
FIG. 6 is an end view of the invention taken along lines 6—6 of FIG. 2 and indicating the portion thereof at the gallery side of a wall.

As shown in FIGS. 2 and 6, the exterior end of penetrator assembly 10, namely, the end adapted for mating with the exterior or gallery surface of wall 3 of chamber 1, includes a penetrator flange 38 that is adapted to be secured by bolts or other such means to a mating flange 40 that may be an integral portion of penetration sleeve 21 and which is secured to the exterior surface of the chamber wall. Electrical conduits 18 terminate in a connector junction box 42 which includes a plurality of exterior connectors 44. Connectors 44 provide means to interconnect exterior cables to the wires contained within electrical conduits 18 to electrically mate the equipment within the chamber to instrumentation, measuring instruments or other such electrical devices contained within gallery 2 and to which operating personnel have hands-on-access.

It will now be apparent that the penetrator assembly of the present invention may be easily removed from wall 3 of a chamber by first utilizing electromechanical or master-slave manipulators, (such as manipulator 8 shown in FIG. 1) to disconnect upper connector assemblies 30 from their respective lower connector assemblies 28 located on connector platform 26. After removing the securing means connecting flanges 38 and 40 on the exterior side of the wall 3, assembly 10 is readily removed with the aid of a lift hook 50 connected to appropriate machinery to support the weight of the assembly. In addition, roller assemblies may preferably be located approximately 30° on either side of the vertical center line along the bottom or lower portion of penetrator assembly 10 to further facilitate ready removal and installation of the penetrator.

It will now be understood that what has been disclosed herein is a modular electrical penetrator assembly for conveying wires through suitable passages in a wall of a chamber containing a hostile environment such as a high radiation or high temperature and the like. The invention comprises a number of novel features including a positionable electrical connector platform for compatibility with remotely operated master-slave or electromechanical manipulators for ease of installation and removal of the assembly.

Although a particular preferred embodiment has been disclosed herein it will now be clear to those having at least ordinary skill in the art to which the present invention pertains, that variations may be made in specific dimensions, geometrical configurations and material content without deviating from the scope of the present invention which is defined by the appended claims.

We claim:

1. An electrical penetrator apparatus for conveying a plurality of electrical wires through an aperture in a wall, the apparatus comprising:
    a substantially cylindrical housing of sufficient length to extend through said wall aperture;
    a plurality of solid disks within said housing and aligned therein in substantially contiguous serial relation along the longitudinal axis of said housing; and
    at least one aperture in each disk of said plurality, said apertures forming a substantially continuous passage suitable for guiding said wires through said plurality of disks;
    said passage being skewed relative to the longitudinal axis of said housing along at least a portion thereof.

2. The apparatus defined in claim 1 further comprising:
    a substantially planar member extending from a first end of said housing in a direction substantially parallel to the longitudinal axis of said housing and having at least one electrical connector affixed thereto for terminating the first ends of at least a portion of said plurality of electrical wires;
    said planar member being positionable about said longitudinal axis whereby said connector may be selectively positioned into any one of a plurality of radial directions relative to said axis.

3. The apparatus defined in claim 2 further comprising:
    a flange member extending radially from said housing at the second end thereof and adapted to circumferentially overlie the portion of said wall adjacent said aperture; and
    means connected to said flange member and having at least one electrical connector affixed thereto for terminating the second ends of said portion of said plurality of electrical wires.

4. The apparatus defined in claim 1 wherein said cylindrical housing comprises:
    a plurality coaxial circular cylinders of unequal diameters and arranged in contiguous longitudinally overlapping relation along respective portions thereof.

5. The apparatus defined in claim 1 wherein in each of said disks further comprises:
    a pair of said disk apertures and wherein said disks are arranged contiguously in a selected serial sequence to form a pair of continuous spiraling passages through at least a portion of said housing.

6. A modular penetration apparatus for extension through an aperture in a wall for providing a passageway through said wall within said aperture but skewed relative to the longitudinal axis of said aperture; the apparatus comprising:
    a plurality of substantially solid disks coaxially aligned for serial relationship along the longitudinal axis of said aperture;
    at least one opening in each said disk, the combination of such openings defining said passageway; and
    circumambient means retaining said disks in substantially fixed relation to one another within said aperture.

7. The apparatus defined in claim 6 wherein said retaining means further comprises:
    an extension member extending longitudinally of said plurality of disks and adapted to protrude beyond one surface defining said wall;
    said extension member being positionable about said longitudinal axis.

8. The apparatus defined in claim 7 wherein said retaining means further comprises:
    a flange member extending radially of said longitudinal axis and adapted to circumferentially overlie said aperture on the other surface defining said wall.

9. The apparatus defined in claim 6 wherein each said opening is uniquely located within its respective disk relative to said longitudinal axis whereby only one serial sequence of said disks provides said passageway.

10. The apparatus defined in claim 6 wherein said retaining means further comprises:
    a plurality of overlapping, concentric coaxial cylinders of similar cross-sectional configuration.

* * * * *